May 28, 1940.    W. S. SEASE    2,202,404
APPARATUS FOR DETERMINING HORIZON PRODUCTIVITY OF WELLS
Filed May 25, 1938
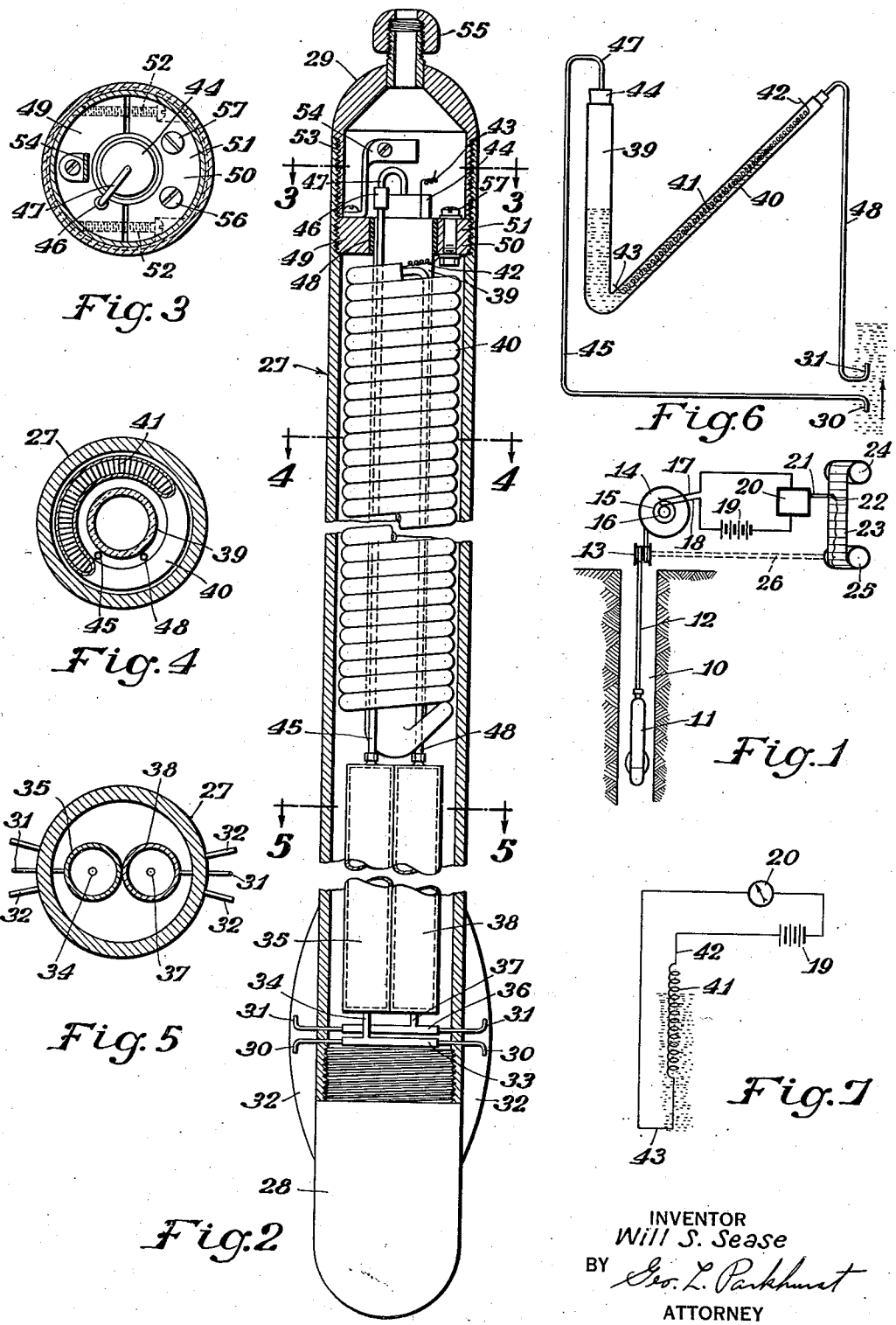
INVENTOR
Will S. Sease
BY Geo. L. Parkhurst
ATTORNEY Patented May 28, 1940

2,202,404

UNITED STATES PATENT OFFICE 2,202,404

APPARATUS FOR DETERMINING HORIZON PRODUCTIVITY OF WELLS

Will S. Sease, Tulsa, Okla., assignor to Stanolind Oil and Gas Company, Tulsa, Okla., a corporation of Delaware Application May 25, 1938, Serial No. 209,928

5 Claims. (Cl. 73—51)

This invention relates to apparatus for determining the flow of fluids from various horizons in deep wells such as oil, gas or water wells, and more particularly to apparatus for the determination of the rate of fluid flow in such wells at various levels therein.

It is well-known that oil, gas or water wells may traverse several fluid-bearing strata at different levels, and that a number of such strata may be simultaneously supplying fluids such as oil, natural gas or water to the wells. A knowledge of the volume of fluid flowing into the well from each of the various strata is very desirable in order that the well may be properly operated. Although this knowledge is particularly important for wells which are being produced under reservoir pressure, it is also desirable in wells equipped with the gas lift or having flow valves offset from the tubing.

It is an object of my invention to provide apparatus for determining the horizon productivity in wells which is rapid and does not require the use of packers or similar devices. Another object is to provide a simple apparatus capable of rapid use for locating the producing horizons in a producing well. Still another object is to provide apparatus for electrically transmitting an indication of the velocity of the fluid rising in a producing well at various levels to the top of the well. A further object is to provide a simple and rugged flowmeter adapted to be lowered into a deep well. Further objects will be apparent from the following detailed description read in conjunction with the drawing in which:

Figure 1 shows schematically a form of apparatus in accordance with my invention;

Figure 2 is a vertical section of a preferred embodiment of apparatus in accordance with my invention;

Figure 3 is a horizontal section taken along line 3—3 of Figure 2;

Figure 4 is a horizontal section taken along line 4—4 of Figure 2;

Figure 5 is an horizontal section taken along line 5—5 of Figure 2;

Figures 6 and 7 are schematic diagrams illustrating the principle used in the apparatus of Figure 2.

In one of its broad aspects my invention comprises apparatus for the determination of the productivities or rates of flow of fluid from the various producing strata of a well, particularly an oil well, by measuring the velocity of the fluid rising within the well at various levels while maintaining substantially unrestricted fluid flow from all of the producing strata.

In using my apparatus the velocity of the fluid flowing up the well is measured by means of a suitable flowmeter which is continuously lowered in the well either throughout its entire depth or over the range which it is desired to explore.

Flowmeters of a number of types may be used in accordance with my invention, but they must of course be adapted to be lowered into a producing well. My preferred form of flowmeter, however, utilizes the Pitot tube principle and will be described in detail below in connection with Figure 2. Regardless of the type employed, means are preferably provided for electrically transmitting an indication of the velocity of the fluid up the well from the level of the flowmeter to the surface of the earth, where it can be recorded continuously in a well-known manner or read and recorded by an operator.

In determining horizon productivity by the use of my apparatus, the flowmeter is continuously lowered into the well and, if the instrument is of the remote-indicating type, observations are made of fluid velocity at various depths either by reading an indicator dial or by making a continuous record. When recording apparatus is used, it is preferred to move the recording tape in synchronism with the lowering of the flowmeter so that a direct plot of fluid velocity versus depth is obtained. If the instrument is of the self-contained recording type, a record is kept of the time at which the flowmeter is at various depths, so that the velocity versus time chart made by the instrument may be utilized to yield information as to the fluid velocity at various depths.

From the velocity data obtained the productive horizons are located by noting the depths at which velocity increases are found when the well is of approximately uniform diameter. In order to evaluate the horizon productivity at various levels, however, it is obvious that the well diameters at those levels must be taken into account, as can easily be done by one skilled in the art of oil or gas production. It is not necessary to calibrate the flowmeter to give direct indications of the velocity of flow of fluids up the well, although this can be done, because the total production is always known, and the relative velocities at various levels give sufficient data to calculate the productivities of the various horizons contributing to the production.

I can also operate by lowering the flowmeter to a given level, observing or recording the velocity at that level, lowering the flowmeter to another level, again determining the velocity, etc. By so operating a number of the advantages of the invention are obtained. This variation is particularly useful when the levels of the producing strata are known and it is desired to determine their productivities. A great deal of time is saved by making velocity measurements at levels just above and just below each of these strata.

Although I have hereinabove referred to the lowering of the flowmeter, obviously the same results can be obtained by making velocity measurements during the upward travel of the flowmeter, or the measurements can be made in both directions of travel of the flowmeter and averaged to obtain more accurate values.

Referring now to Figure 1, which is a schematic representation of my preferred apparatus, a producing well 10 is shown within which a suitable flowmeter 11 is suspended by means of a cable 12. Cable 12 passes around a measuring spool 13 equipped with a revolution counter or similar device (not shown) so that the depth of flowmeter 11 at any time can be read, and is supported by and wound upon drum 14, which is provided with well-known means not shown for rotation in either direction so that flowmeter 11 can be lowered or raised in well 10 as desired.

If flowmeter 11 is of the self-contained recording type, no other apparatus is necessary, but in the embodiment shown, flowmeter 11 is of a type which contains means for transforming changes in velocity of the fluid up the well into electrical variations, so that two electrical conductors are incorporated in cable 12 for transmitting these variations to the top of the well which terminate at their upper ends in electrical contact with slip rings 15 and 16 on drum 14. Brushes 17 and 18 contact rings 15 and 16 respectively and are connected electrically with battery 19 and indicating device 20 in series. When flowmeter 11 contains means for transforming changes in fluid velocity into electrical variations of a type which produces a variable electromotive force, battery 19 can be omitted and indicating device 20 can be an indicating or recording voltmeter or potentiometer.

Preferably, however, the device for translating flow variations into electrical variations is of a type which produces changes in the value of a resistance responsive to variations in fluid flow, this resistance being incorporated in the circuit consisting of the conductors in cable 12, slip rings 15 and 16, brushes 17 and 18, battery 19 and indicating device 20. In this case indicating device 20 is an indicating or recording ammeter, and as shown is a recording ammeter having a pen arm 21 and pen 22 so that a record of the electrical current flow is made upon chart 23. Chart 23 is supplied by spool 24 and wound upon spool 25, which is actuated by a clock mechanism or, preferably, by a suitable mechanism connected to measuring spool 13, indicated schematically by dotted lines 26. The connecting mechanism for example can be entirely mechanical or can include the well-known Selsyn motors, but it must be such that the rate of rotation of spool 25 is much lower than that of measuring spool 13 and that the rates of rotation of the spools are in proportion to each other, so that a chart showing velocity of fluid flow versus depth of the flowmeter is obtained.

My preferred flowmeter is shown in detail in Figure 2. A tubular metal case 27, having a weighted plug 28 closing its bottom end and an externally threaded top cap 29, is provided immediately above plug 28 with two downwardly-facing Pitot tubes 30 and two upwardly-facing Pitot tubes 31 extending therethrough and arranged so as to provide a pressure differential due to the velocity of fluids flowing outside but adjacent case 27 in a direction parallel to the longitudinal axis thereof. The fit between Pitot tubes 30 and 31 and case 27 is intentionally made quite loose so that no pressure differential can be built up between the outside and inside of case 27. A plurality of protecting fins 32 are affixed to case 27 on either side of Pitot tubes 30 and 31 so as to prevent injury to the Pitot tubes from contact with the sides of the well. Pitot tubes 30 lead to horizontal tube 33 within case 27 having a vertical branch 34 communicating with an elongated reservoir 35, and Pitot tubes 31 similarly communicate with reservoir 38 by means of tube 36 and branch 37.

Immediately above reservoirs 35 and 38 is a large tube 39, preferably glass, having a small helical tube 40, preferably glass, surrounding it and communicating therewith at its lower end. Helical tube 40 contains a coil of resistance wire 41 (see Figure 4) throughout its length, the upper end of which is provided with a lead 42, and the lower end with a lead 43 which passes up through tube 39 to its upper end and extends between tube 39 and the rubber stopper 44 enclosing its upper end. Tubes 39 and 40 are normally filled with a conducting liquid such as a brine solution so that a portion of resistance coil 41 is short-circuited. Preferably resistance wire 41 is partially embedded in the glass of tube 40 in order to prevent any movement thereof. This can be accomplished for example by coiling the resistance wire around a metal rod, slipping a close-fitting glass tube over the coil, flowing the glass around the wire by means of a blow torch, withdrawing the metal rod, and then bending the glass tube into helical form.

Extending upwardly from the top of reservoir 35 between tube 39 and helical tube 40 is positive pressure tube 45, which is attached by connection 46 with one arm of inverted U-tube 47, the other arm of which passes through stopper 44. Similarly negative pressure tube 48 extends upwardly from reservoir 38 and communicates with the upper end of helical tube 40. The purpose of reservoirs 35 and 38 is to provide a means of preventing oil, dirt, etc. from entering tubes 39 and 40 and contaminating the liquid therein.

The entire internal assembly is held in position by means of rubber packing 48 between the two portions 49 and 50 of a split supporting member 51 and the upper portion of tube 39. The portions 49 and 50 are held together and made to grasp packing 48 firmly by means of screws 52 (Figure 3), and the entire supporting member 51 is threaded on its circumference so that it is held in position by means of internally threaded portion 53 of case 27 and top cap 29. Supporting member 51 also carries an anchor 54 for the suspension cable (not shown) which normally is inserted through packing connection 55 in top cap 29. Two insulated electrical terminals 56 and 57 are provided in supporting member 51, lead 42 being connected to the lower end of terminal 57 and lead 43 to the upper end of terminal 56. By connecting the two electrical conductors contained in the suspension cable with terminals 56 and 57, resistance 41 is made available as a part of an electrical circuit as shown for instance in Figures 1 and 7.

The principle of operation of my improved flowmeter may be more readily understood from Figures 6 and 7 in which the various elements are given the same reference figures as corresponding parts of Figure 2.

From the above description it will be seen that the Pitot tube arrangement is of the combined reverse impact type which gives a relatively large pressure differential due to the velocity of the fluid flowing in the direction of the arrow on Figure 6. This pressure differential causes the level of the conducting liquid to rise in tube 40 a distance responsive to the fluid velocity, thereby short-circuiting a number of turns of the resistance coil 41. The resistance of coil 41 is therefore automatically varied in accordance with the velocity of the fluid impinging on the Pitot tubes, and an indication of this fluid velocity can be obtained merely by measuring the value of the resistance between terminals 42 and 43.

This measurement is made by connecting coil 41 into a circuit as shown in Figure 7 with a battery 19 and an indicating device 20, which can be of the indicating or recording type, as hereinabove described. A higher level of the conducting fluid in tube 40 will therefore reduce the resistance of coil 41 and cause a greater current to flow in the circuit, which will of course be indicated or recorded by instrument 20. Since battery 19 and instrument 20 are located at the top of the well and my improved flowmeter is adapted to be lowered into a flowing well, the velocity of the fluid flowing up the well at any level or series of levels therein can be determined readily.

While I have described my invention in connection with certain specific embodiments thereof, I do not desire to be limited thereto, but only by the scope of the following claims.

I claim:

1. Apparatus for determining the horizon productivity in a producing oil or gas well which comprises an elongated case, means for changing the elevation of said case within said well, means within said case for holding a supply of liquid, means responsive to the velocity of the fluid flow adjacent the exterior of said case parallel to the longitudinal axis thereof for changing the level of said liquid, means for converting the changes in level of said liquid into electrical variations, and means for transmitting said electrical variations to the top of said well.

2. Apparatus for determining the horizon productivity in a producing oil or gas well which comprises an elongated case, means for changing the elevation of said case within said well, means within said case for holding a supply of liquid, means responsive to the velocity of the fluid flowing adjacent the exterior of said case parallel to the longitudinal axis thereof for changing the level of said liquid, means for converting the changes in level of said liquid into electrical variations, and means for recording said electrical variations.

3. Apparatus for determining the horizon productivity in a producing oil or gas well which comprises an elongated case, means for changing the elevation of said case within said well, means within said case for holding a supply of a liquid, means responsive to the velocity of the fluid flowing adjacent the exterior of said case parallel to the longitudinal axis thereof for changing the level of said liquid, an electrical resistance varying in response to changes in the level of said liquid, means for supplying an electrical current to said resistance, and means for measuring the resulting variations in the value of said electrical current.

4. An electric flowmeter for oil or gas wells which comprises an elongated case, a helical tube supported within said case, a liquid reservoir associated with said tube, a supply of a conducting liquid partly filling said reservoir and said tube, means responsive to the velocity of the fluid flowing adjacent the exterior of said casing parallel to the longitudinal axis thereof for changing the level of said conducting liquid in said tube, an electrical resistance associated with said helical tube in contact with said conducting liquid, means for passing an electric current through said resistance, and means for indicating changes in said electric current.

5. An electric flowmeter according to claim 4 wherein said means for changing the level of said conducting liquid includes a Pitot tube.

WILL S. SEASE.